United States Patent [19]

Feeman

[11] Patent Number: 4,853,466
[45] Date of Patent: Aug. 1, 1989

[54] WATER-SOLUBLE DISAZO REACTIVE DYES AND METALS COMPLEXES (CONTAINING PHOSPHONIC ACID GROUPS) FOR DYEING CELLULOSIC FIBERS

[75] Inventor: James F. Feeman, Wyomissing, Pa.

[73] Assignee: Crompton & Knowles Corporation, Stamford, Conn.

[21] Appl. No.: 123,391

[22] Filed: Nov. 20, 1987

[51] Int. Cl.$^4$ .................. C09B 62/82; C09B 62/825; C09B 62/83; C09B 62/835
[52] U.S. Cl. .................. 534/617; 534/583; 534/629; 534/641; 534/642; 534/677; 534/684; 534/688; 534/693; 534/716; 534/719; 534/727
[58] Field of Search .............. 534/617, 641, 583, 727, 534/629, 688, 716, 642, 693, 677, 684, 719

[56] References Cited

U.S. PATENT DOCUMENTS

| | | | |
|---|---|---|---|
| 4,105,020 | 4/1979 | Swidler et al. | 534/617 X |
| 4,150,021 | 4/1979 | Swidler et al. | 534/617 |
| 4,472,308 | 9/1984 | Gauthier | 534/617 |

FOREIGN PATENT DOCUMENTS

| | | | |
|---|---|---|---|
| 2353149 | 5/1974 | Fed. Rep. of Germany | 534/617 |
| 396256 | 1/1966 | Switzerland | 534/617 |
| 785457 | 10/1957 | United Kingdom | 534/617 |

*Primary Examiner*—Floyd D. Higel
*Attorney, Agent, or Firm*—Bernard Francis Crowe

[57] ABSTRACT

This invention relates to disazo dyes, and their metal complexes, which are useful for dyeing cellulosic fibers in lightfast and washfast hues. In addition, these dyes have high water solubility, a high degree of fixation, acceptable migration and high water solubility with reasonable cost.

The disazo dyes have the structure:

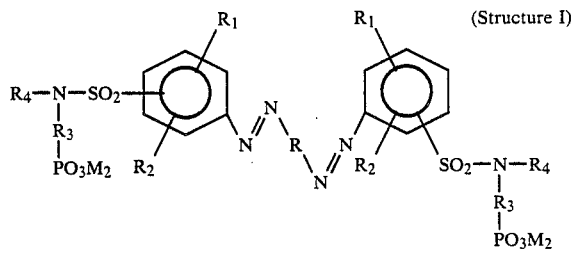

(Structure I)

Wherein: R is selected from

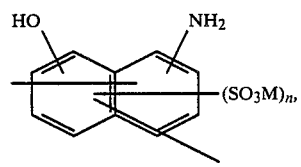

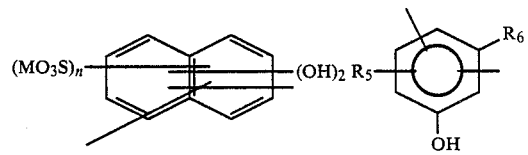

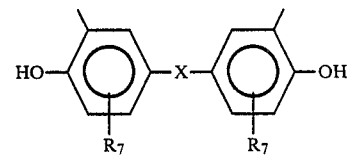

Wherein
the azo bonds are ortho to the —OH or NH$_2$ groups;
R$_1$ is H, lower alkyl, lower alkoxy, or —CO$_2$M;
R$_2$ is H, lower alkyl, lower alkoxy, Cl;
R$_3$ is lower alkylene;
R$_4$ is H, —lower alkyl;
R$_5$ is H, lower alkyl, —CO$_2$M;
R$_6$ is OH or —NH$_2$;
R$_7$ is H, —CH$_2$SO$_3$M;
M is H, Na, Li, K, Mg, Ca, NH$_4$;

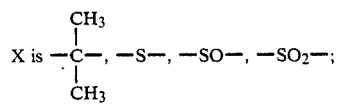

and n is 0, 1, 2.

7 Claims, No Drawings

WATER-SOLUBLE DISAZO REACTIVE DYES AND METALS COMPLEXES (CONTAINING PHOSPHONIC ACID GROUPS) FOR DYEING CELLULOSIC FIBERS

This invention relates to disazo dyes, and their metal complexes, which are useful for dyeing cellulosic fibers in light fast and wash fast hues. These dyes have a high degree of fixation, acceptable migration during drying, high water solubility and reasonable cost.

This disazo dyes have the structure, before metalization:

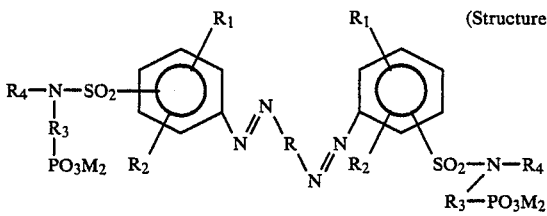
(Structure I)

Wherein: R is selected from

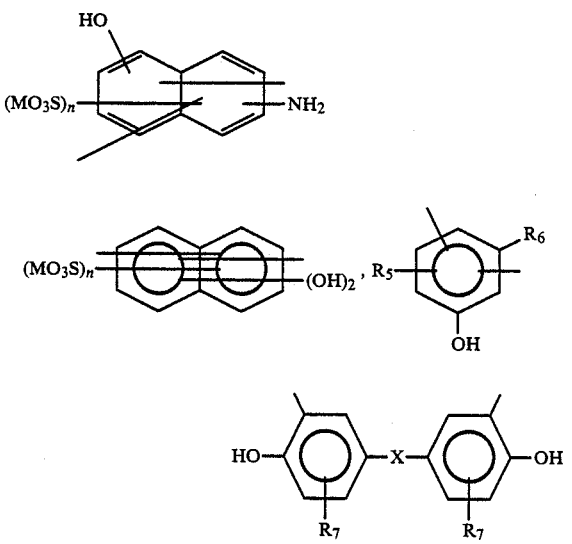

Wherein
the azo bonds are ortho to the —OH or $NH_2$ groups:
$R_1$ is H, lower alkyl, lower alkoxy, or —$CO_2M$
$R_2$ is H, lower alkyl, lower alkoxy, Cl;
$R_3$ is lower alkylene;
$R_4$ is H, —lower alkyl
$R_5$ is H, lower alkyl, —$CO_2M$;
$R_6$ is OH or —$NH_2$
$R_7$ is H, —$CH_2SO_3M$;
M is H, Na, Li, K, Mg, Ca, $NH_4$;

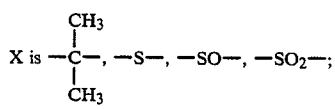

and n is 0, 1, 2.

A preferred group of dyes of this invention has the structure before metalization:

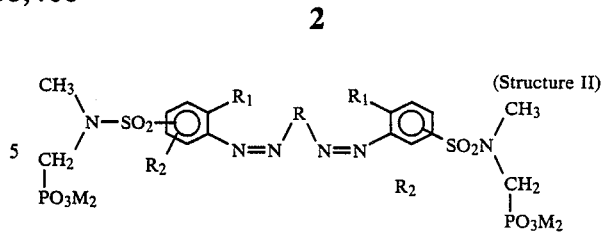
(Structure II)

in which
R is

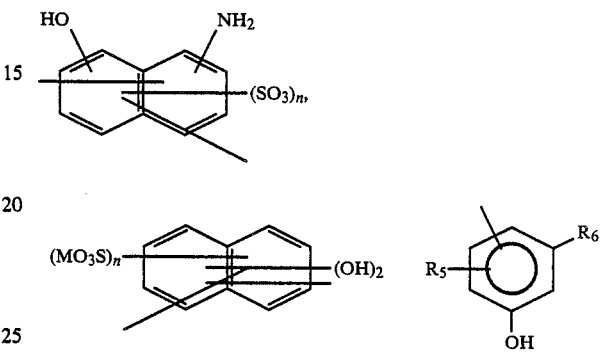

and the azo bonds are ortho to the —OH and —$NH_2$ groups;
$R_1$ is H, lower alkyl, lower alkoxy or $CO_2M$;
$R_2$ is —H, lower alkyl, —lower alkoxy, —Cl;
$R_5$ is —H, lower alkyl, —$CO_2M$;
$R_6$ is —OH, —$NH_2$;
M is H, Na, Li, K, $NH_4$; and
n is 0, 1, 2.

The dyes of this invention are prepared by diazotizing an intermediate having the structure:

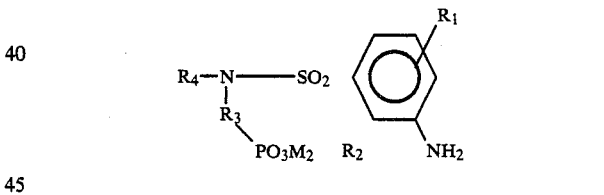

and coupling twice with a bifunctional benzene or naphthalene intermediate containing at least one hydroxyl group and one additional hydroxyl or amino group located in positions which allow coupling ortho to them.

Suitable bifunctional intermediates include, for example:
Resorcinol
3-aminophenol
2,4-dihydroxybenzoic acid
2,6-dihydroxybenzoic acid
3,5-dihydroxytoluene
2,3-dihydroxynaphthalene-6-sulfonic acid
2,3-dihydroxy-naphthalene
1,8-dihydroxynaphthalene-3,6-disulfonic acid
2,5-dihydroxynaphthalene-7-sulfonic acid
1-amino-8-naphthol-3,6-disulfonic acid
2,8-dihydroxynaphthalene-6-sulfonic acid
1,8-dihydroxynaphthalene-4-sulfonic acid
1,3-dihydroxynaphthalene-5,7-disulfonic acid
1,5-dihydroxynaphthalene-3,7-disulfonic acid
1,7-dihydroxynaphthalene-3,6-disulfonic acid
1-amino-8-naphthol-3,5-disulfonic acid 1-amino-8-naphthol-4,6-disulfonic acid
2-amino-5-naphthol-7-sulfonic acid
1-amino-8-naphthol-4-sulfonic acid
2-amino-7-naphthol-5-sulfonic acid
4,4'-isopropylidenediphenol
1,3-dihydroxynaphthalene
1,5-dihydroxynaphthalene
2,3-dihydroxynaphthalene
2,6-dihydroxynaphthalene
2,7-dihydroxynaphthalene
3,6-dihydroxynaphthalene-2,7-disulfonic acid
4,4'-thiodiphenol
4,4'-sulfonyldiphenol
Sulfomethylated-4,4'-isopropylidene diphenol
Sulfomethylated-4,4'-thiodiphenol Suitable components for diazotization are described and claimed in my copending simultaneously filed application "N-Alkyl-N-(aminophenylsulfonyl)-amino-alkyl-phosphonic acids".

Preferred structure of intermediates especially useful for making the disazo copper complexes of this invention are:

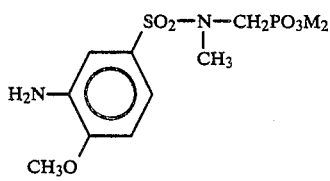

and

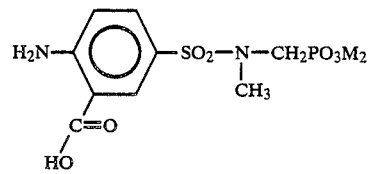

The new azo dyes can be converted to their heavy metal complexes, e.g. the 1:1 copper, nickel or chromium complexes or the 1:2 chromium or cobalt complexes by treatment with metal-yielding agents. These metal complex dyes are a preferred feature of the invention, especially the copper complexes. The latter have outstanding light fastness on cellulosic fibers and are readily prepared by demethylative coppering in aqueous solution where the methyl radical of the methoxy group ortho to the azo group is eliminated, the oxygen forming a covalent bond with the copper atom, or by direct reaction of copper with the carboxyl group where this is present in the intermediate.

The coppered disazo dyes which are preferred are respresented by the formulas:

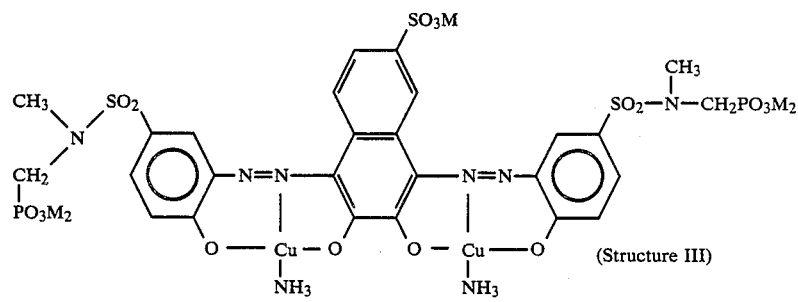

(Structure III)

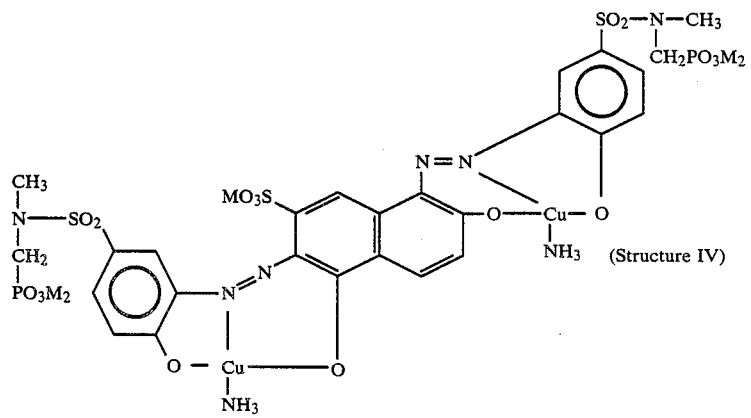

(Structure IV)

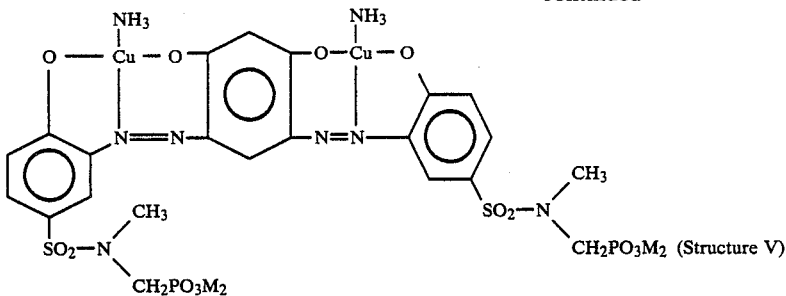

(Structure V)

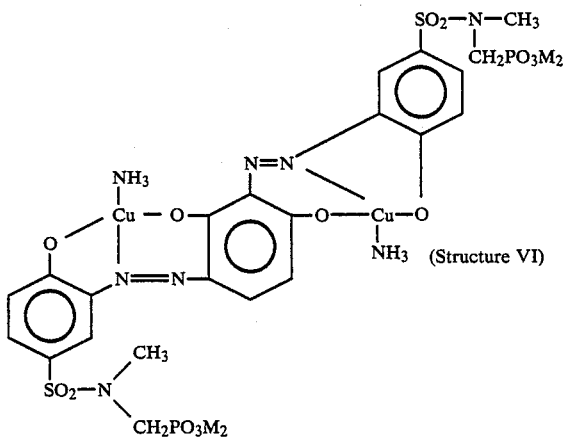

(Structure VI)

The new dyes can be used directly from reaction as aqueous solutions or can be isolated as solid products by conventional means such as spray drying or precipitation and filtration. They are preferably isolated in the acid form or in the form of the ammonium salt, or partly as an alkali metal salt, e.g. Li, Na or K. These salts can be obtained by adding a halide, e.g. the chloride, of the desired alkali metal, or an ammonium halide to the reaction mixture before isolation.

The new dyes are soluble in water because of the presence of the phosphonic groups and of any sulfonic acid groups(s) present. They can be used, in general, for coloring textiles, which are dyeable by anionic group containing dyes, such as natural and synthetic polyamides, but especially natural and regenerated cellulosics, such as cotton, linen and rayon.

For application to cellulosic textiles, they are applied to the fiber by conventional means such as padding and spraying as an aqueous solution at weakly acid pH, dried, and fixed by subjecting the fabric to temperatures of from 95° to 230° C. in the presence of a carbodiimide, e.g. dicyandiamide or cyanamide using the processes described in U.S. Pat. Nos. 4,134,722 and 4,139,345.

The new dyes are also suitable for application to mixed fabrics of cellulosics and synthetic fibers, and especially polyester materials, together with disperse dyes from a single dyebath or printing paste. These dyes have the advantage over other conventional dyes, of, e.g., the mono- and dichlorotriazinyl or vinyl sulfone types, which must be applied at alkaline pH values for fixation. This pH range causes flocculation of most disperse dyes. In the case of the phosphonic acid containing dyes, of which the new dyes are an example, the acidic condition used for fixation has no effect on the dispersions and the two classes of dyes work well together.

Dyeings of cellulosics, alone or in mixed fabrics, are very fast to washing, perspiration and light. They also have a high degree of fixation, 75%–90%, which generally exceeds that of prior art dyes; this is attributable to the presence of two phosphonic acid groups per molecule which provide two potential points of attachment to the cellulose.

The invention is illustrated by the following examples in which parts are by weight.

EXAMPLE 1

N-Methyl-N-(3-amino-4-methoxyphenylsulfonyl)aminomethylphosphonic acid (310 parts), in 1150 parts of water, 280 parts of concentrated hydrochloric acid and 450 parts of ice, was diazotized at 0°–5° C. with a solution of 70 parts of sodium nitrite in 150 parts of water. After removal of a slight excess of nitrous acid with sulfamic acid, 131 parts of 2,3-dihydroxynaphthalene-6-sodium sulfonate, as a fine powder, was added and stirred well. Sodium carbonate (80 parts) was sifted in gradually during 1 hour, keeping temperature at 5°–10° C. with ice, during which the pH rose from 1.5 to 3.8 and coupling took place to form a dark solution. The pH was then raised to 7.7 by adding in a thin stream 160 parts of concentrated ammonia (28%). The resultant solution was heated to 60° C., and 250 parts of cupric sulfate pentahydrate crystals was added. The temperature was raised to 95° C. and held at 95°–100° for sixteen hours to complete demethylation and coppering. The dark navy blue solution was cooled to ambient temperature, clarified through a filter using 8 parts of diatomaceous earth as a filter aid and bottled (4700 parts).

The dye thus obtained, when applied to cellulosic textile materials by the methods given in U.S. Pat. No. 4,134,722 gave pale to deep navy-blue dyeings having excellent light fastness, as well as outstanding fastness to wet treatments.

This dye corresponds to Structure III in which M is Na/NH4. When coupling was made using only ammonia instead of sodium carbonate to raise the pH, the dye in which M is NH4 resulted. Alternatively, following coupling using sodium carbonate to raise the pH, acidification to pH 1 with concentrated HCl precipitated the free acid form which could be filtered and redissolved as the ammonium or lithium salt to the virtual exclusion of sodium salt.

EXAMPLE 2

To diazonium salt solution prepared as in Example 1 from 31 parts of N-methyl-N-(3-amino-4-methoxyphenylsulfonyl)-aminomethylphosphonic acid was added a solution of 13.1 parts of 2,5-dihydroxynaphthalene-7-sulfonic acid, sodium salt, in 125 parts of water. The pH was slowly raised to 6 by sifting in sodium carbonate (10 parts) resulting in an orange precipitate of monoazo coupling product. Addition of 18 parts more sodium carbonate during 1 hour raised the pH to 9 and caused coupling to a rubine colored solution of disazo dye. The solution was heated to 60° C. and the pH lowered to 1 by adding 66 parts of concentrated (31.5%) hydrochloric acid. The dye crystallized out and was then filtered.

The resultant paste was dissolved in 250 parts of water with 36 parts of concentrated ammonia solution. Cupric sulfate pentahydrate crystals (25 parts) was added and the solution heated at 95° C. for 18 hours. The color of the solution changed from rubine to violet. Filtration gave 491 parts of dye solution, the dye corresponding in structure to Structure IV in which M is NH4. Application of this dye to cellulosic textile materials imparted violet hues having excellent light and wet fastness.

EXAMPLE 3

Resorcinol (55 parts) was added to diazonium salt solution prepared as in Example 1 from 310 parts of N-methyl-N-(3-amino-4-methoxyphenylsulfonyl)-aminomethylphosphonic acid. The pH was raised in 20 minutes to 7.5 by adding dropwise 225 parts concentrated ammonia solution while keeping the temperature in the range of 5°–15° C. Coupling occurred forming a dark brown solution (4000 parts).

Formation of the copper complex was carried out by heating the solution to 60° C., adding 225 parts of concentrated ammonia solution and 250 parts of cupric sulfate pentahydrate crystals, and heating at 95° C. for 16 hours. The dark brown solution (4786 parts) was filtered to remove traces of insoluble matter. The product is believed to have Structure VI, in which M is NH4.

The dye thus obtained, when applied to cellulosic textile materials by the methods of U.S. Pat. No. 4,134,722 imparted brown hues having excellent light and wet fastness.

If the couplings are carried out at alkaline pH in the presence of excess NH4OH, followed by coppering, the resultant dye is believed to have Structure V in which M is NH4.

EXAMPLE 4

In Example 3, while otherwise proceeding as described, when the resorcinol was replaced by a solution of 136 parts of the disodium salt of 4,4'-isopropylidenediphenol in 540 parts of water, a brown dye was obtained which imparted brown hues to cellulosic fibers which had very good light and wash fastness.

EXAMPLE 5

In Example 3, while otherwise proceeding as described, when the resorcinol was replaced by 54.5 parts of 3-aminophenol, coupling gave a dark yellow-brown solution of the dye having the structure:

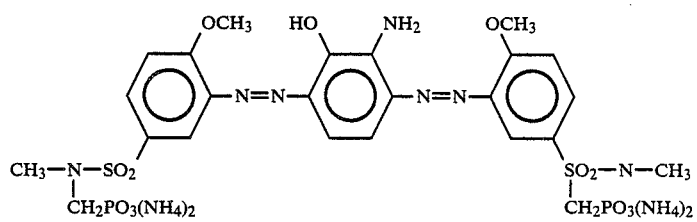

When this dye was coppered as in Example 3, a deep red-brown solution was obtained.

Application to cotton by the process of U.S. Pat. No. 4,134,722 gave brown hues having excellent light and wash fastness.

EXAMPLE 6

To diazonium salt solution prepared as in Example 1 from 31 parts of N-methyl-N-(3-amino-4-methoxyphenylsulfonyl)-aminomethylphosphonic acid at 5° C. was added 17 parts of 1-amino-8-naphthol-3,6-disulfonic acid as a fine powder. Stirring 18 hours gave a red monoazo dye in which coupling took place in ortho position to the amino group in the 1-amino-8-naphthol-3,6-disulfonic acid. The pH was then raised to 7 by adding concentrated ammonia solution, resulting in coupling ortho to the hydroxyl group, yielding a blue solution. Concentrated ammonia solution (25 parts) was then added followed by 25 parts of cupric sulfate pentahydrate. The blue solution turned violet and then bluish-red after several hours heating at 95° C. The solution, after heating for 24 hours was clarified and bottled. The dye solution thus obtained, when applied to cellulosic textile materials by the methods given in U.S. Pat. No. 4,134,722 imparted bluish-red hues having very good light and wet fastness.

This dye is believed to have the structure:

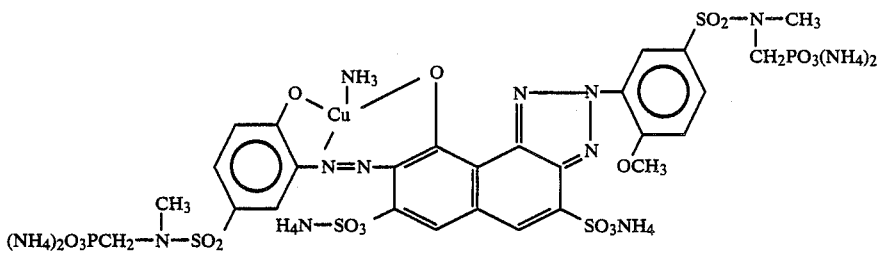

EXAMPLE 7

N-(4-Aminophenylsulfonyl)-N-methylaminomethylphosphonic acid (56 parts) in 56 parts of water and 35 parts of concentrated hydrochloric acid was cooled to 15° C. by addition of ice and diazotized by addition, during 1 hour as absorbed, of 14 parts of sodium nitrite dissolved in 40 parts of water. After removal of a slight excess of nitrous acid, 34.1 parts of 1-amino-8-naphthol-3,6-disulfonic acid, monosodium salt, was added as dry, finely ground, powder. The mixture was stirred for four hours at 5°-10° C. and pH 1 resulting in coupling ortho to the amino group of the 1-amino-8-naphthol-3,6-disulfonic acid as a red precipitate. The pH was then raised to 7 by slow addition of 44 parts of concentrated aqueous ammonia. Coupling took place to give 593 parts of a deep navy-blue solution which was clarified by filtration and bottled. The product has the structure:

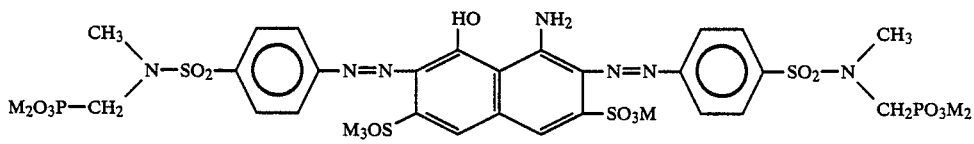

wherein M is NH4/Na.

When dyed on cotton by the process of U.S. Pat. No. 4,134,722, this dye gave navy-blue to black hues, having good light fastness, at heavier depths of hue, and excellent washfastness.

EXAMPLE 8

In Example 3, while otherwise proceeding as described, when the resorcinol was replaced by 77 parts of 2,4-dihydroxybenzoic acid, coupling gave a yellow-brown solution of the disazo dye having the structure:

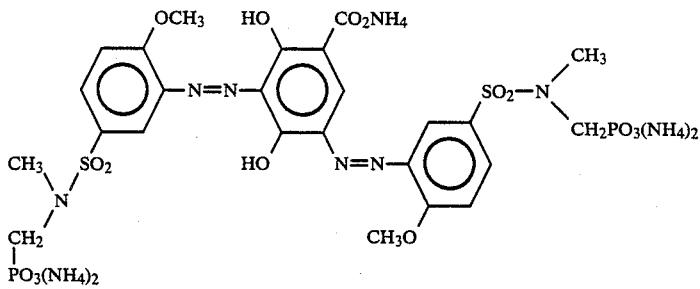

When this dye was coppered as in Example 3, demethylative complex formation occurred, resulting in a deep red-brown solution. When applied to cotton by the process of U.S. Pat. No. 4,134,722, this dye imparted light and wash fast brown hues.

EXAMPLE 9

In Example 1, while otherwise proceeding as described, but replacing the 2,3-dihyroxynaphthalene-6-sulfonic acid with 80 parts of 1,5-dihydroxynaphthalene, coupling gave a black dye solution which, subjected to demethylative coppering by the method of Example 1, remained a black solution and dyed cotton in fast brown hues.

What is claimed is:

1. A disazo dye and its copper, cobalt or chromium complex having the structure before metallization:

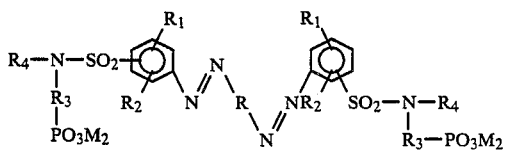

Wherein: R is selected from

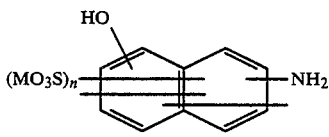

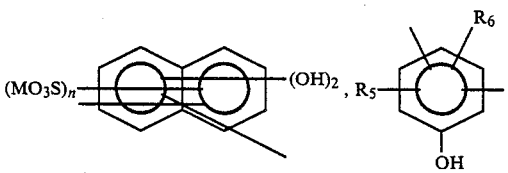

-continued

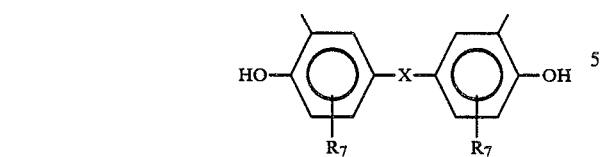

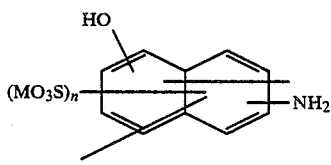

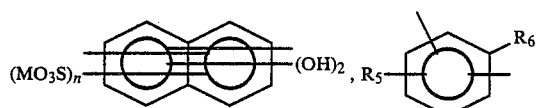

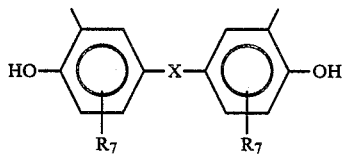

Wherein
the azo bonds are ortho to the —OH or NH₂ groups;

$R_1$ is H, lower alkyl, lower alkoxy, or —CO₂M;
$R_2$ is H, lower alkyl, lower alkoxy, Cl;
$R_3$ is lower alkylene;
$R_4$ is H, -lower alkyl;
$R_5$ is H, lower alkyl, —CO₂M;
$R_6$ is OH or —NH₂;
$R_7$ is H, —CH₂SO₃M:
M is H, Na, Li, K, Mg, Ca, NH₄;

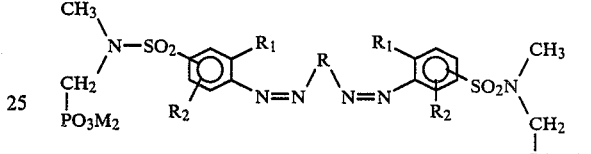

and n is 0, 1, 2.

2. The dye as claimed in claim 1 wherein $R_3$ is —CH₂— and $R_4$ is —Ch₃.

3. The dye as claimed in claim 1 wherein the structure before metalization is:

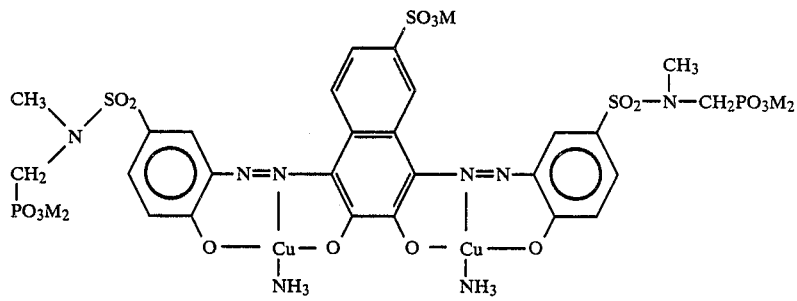

4. The dye as claimed in claim 1 having the structure:

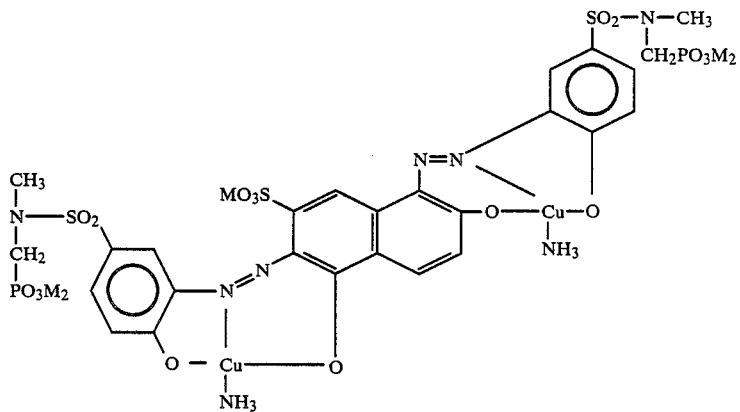

5. The dye as claimed in claim 1 having the structure:

6. The dye as claimed in claim 1 having the structure:

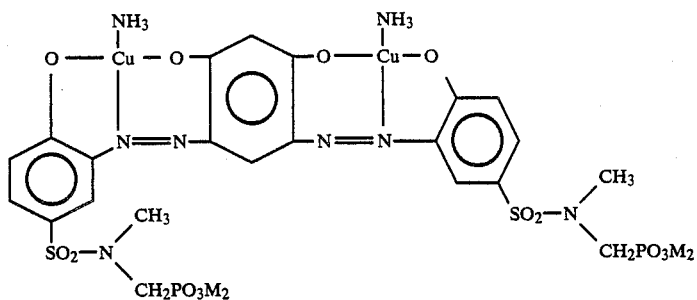
7. The dye as claimed in claim 1 having the structure:
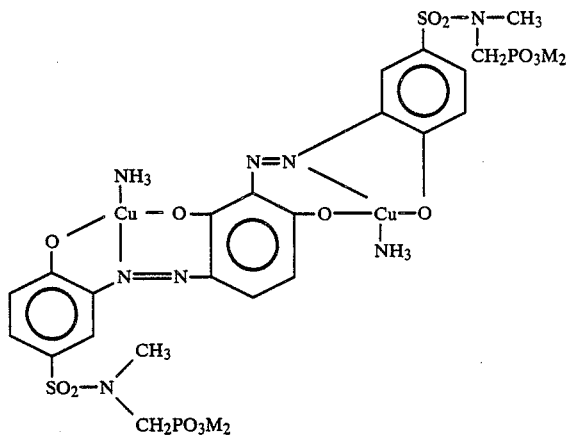
* * * * *